PAUL J. HOLMES
INVENTOR.

United States Patent Office 2,959,965
Patented Nov. 15, 1960

2,959,965
TRANSDUCER SYSTEMS

Paul J. Holmes, Laguna Beach, Calif., assignor to Borg-Warner Corporation, Chicago, Ill., a corporation of Illinois Filed June 4, 1958, Ser. No. 739,710

9 Claims. (Cl. 73—517)

This invention pertains to mechanical-electrical transducer systems and more particularly to methods for improving the operational performance of such transducers and to systems for effectuating such improved transducer performance.

It has been found extremely desirable in certain fields of endeavor, as for instance in the fields of gauging or measuring certain variable conditions, to employ mechanical-electrical transducers comprising electrically conductive vibratory strings which are caused to vibrate at a frequency depending upon the condition being sensed. Under certain circumstances, in fact, it has been found most desirable to employ a transducer having a pair of electrically conductive vibratory strings interconnected by means of a condition responsive instrumentality which is caused to move in accordance with a change in a physical condition being sensed. A specific application wherein such a transducer is particularly desirable, if not a necessity, is in the sensing of acceleration and deceleration forces as occur whenever a vehicle changes its velocity. For such application, the condition sensing means or instrumentality which interconnects the several vibratory strings takes the form of a seismic mass which, as will be readily understood, is caused to move back and forth with acceleration and deceleration, such seismic mass, of course, being properly supported in a frictionless floating manner.

As the seismic mass moves in either of the two opposite directions, the tension of the several vibrating strings are varied equally and oppositely so as to effect equal but opposite variations in the fundamental frequencies of vibration thereof. As will be readily apparent to those persons skilled in the art, an indication of the amount of acceleration or deceleration can then be readily afforded merely by comparing the frequencies of vibration of the several vibrating strings.

However, it has been discovered that the above explained double string transducers have certain deficiencies or shortcomings in that the several vibratory strings are susceptible of both electrical coupling and mechanical coupling due to the fact that the condition responsive mass must be movable and the electrically conductive support means for such mass must be common to both of the electrically conductive strings. Because each of the vibratory strings conducts electrical current, the current in both of the strings flows through the common condition responsive means and the support means therefor, thereby providing a common electrical impedance in the electrical circuits of the several strings. This, of course, causes changes in current flow in one string to be reflected in the circuit of the other string thereby disrupting the electrical independence of such strings and greatly diminishing the accuracy or intelligence of any comparison between the frequencies of vibration of the several strings. To be more specific, a change in current flow through one of the strings, which necessarily results from a change in the frequency of vibration thereof, creates a corresponding change in the current flow through the other string, and since the frequency of vibration of such other string is dependent upon the current flow therethrough, the frequency of vibration of such other string is correspondingly altered from its true frequency of vibration corresponding to the change in tension thereof. As will be readily understood, such electrical coupling exists in both directions, that is from one string to the other and vice-versa, thereby further destroying the desired precise relationship between the vibrational frequencies of the several strings and the condition being sensed.

Also, since the condition responsive mass which interconnects the several vibratory strings must be movable in response to variations in the condition being sensed, it has been discovered that the mechanical vibration of either one of the strings is transmitted to the other string through such interconnecting condition responsive means. This, of course, further disrupts the desired precise relationship between the frequencies of vibration of the strings and the condition being sensed, and also creates a tendency for the several strings to lock together in mechanical vibration when such strings are vibrating at or near the same frequency. This, of course, causes a further discrepancy between the frequencies of vibration and the condition being sensed in that a considerably greater change in tension of the several strings is then required to "break" such strings from their mechanically locked condition.

In view of the foregoing, it is an object of this invention to teach a method for eliminating electrical coupling of the several electrically conductive vibratory strings of a mechanical-electrical transducer.

Another object of the present invention is to teach a method for eliminating mechanical coupling of the several electrically conductive vibratory strings of a mechanical-electrical transducer.

Another object is to teach a method for eliminating bath the electrical and mechanical coupling of the several electrically conductive vibratory strings of a mechanical-electrical transducer.

Another object is to teach the methods as characterized above which rely primarily upon electrical circuitry and principles.

Another object of this invention is to provide an improved system comprising a mechanical-electrical transducer as characterized above, which system prevents any effects of electrical coupling from appearing in the output of the readout equipment which indicates the frequency of vibration of the strings.

Another object is to provide a system as characterized above which prevents any effects of the mechanical coupling from appearing in the output of the readout equipment.

Another object is to provide a system as characterized above wherein the effects from both electrical coupling and mechanical coupling are prevented from appearing in the output of the readout equipment.

Another object of the present invention is to provide a system as characterized above which electrically compensates for any effects which might appear in the output of the readout equipment due to either or both of the aforementioned electrical and mechanical coupling.

Another object of this invention is to provide a system whereby the vibration of one of the strings due to mechanical coupling thereof with the other vibratory string is completely eliminated so that said one string is not moved in any manner whatsoever due to movement of said other string.

Another object is to provide a system as characterized above, which system causes a current to flow through each of the vibratory strings of such magnitude and phase as to create a force therein which completely balances any force created therein by virtue of the transmission of vibrating forces from one to another of such strings.

Another object of this invention is to provide a system as characterized above which is simple in construction and easy to operate and maintain.

Another object is to provide the foregoing system for elimination of both the electrical and mechanical coupling in a manner solely dependent upon electrical components and principles.

These and other more specific objects and advantages of the present invention will be apparent from the following detailed description from which it will be apparent that the gist of the improvement is the provision of a system comprising a mechanical-electrical transducer for effecting improved operational performance of the latter.

A clear conception of the features constituting the present invention, and of the construction and operation of a typical transducer system embodying the invention, may be had by referring to the drawings accompanying and forming a part of this specification wherein like reference characters designate the same or similar parts in the various views.

Figure 1:
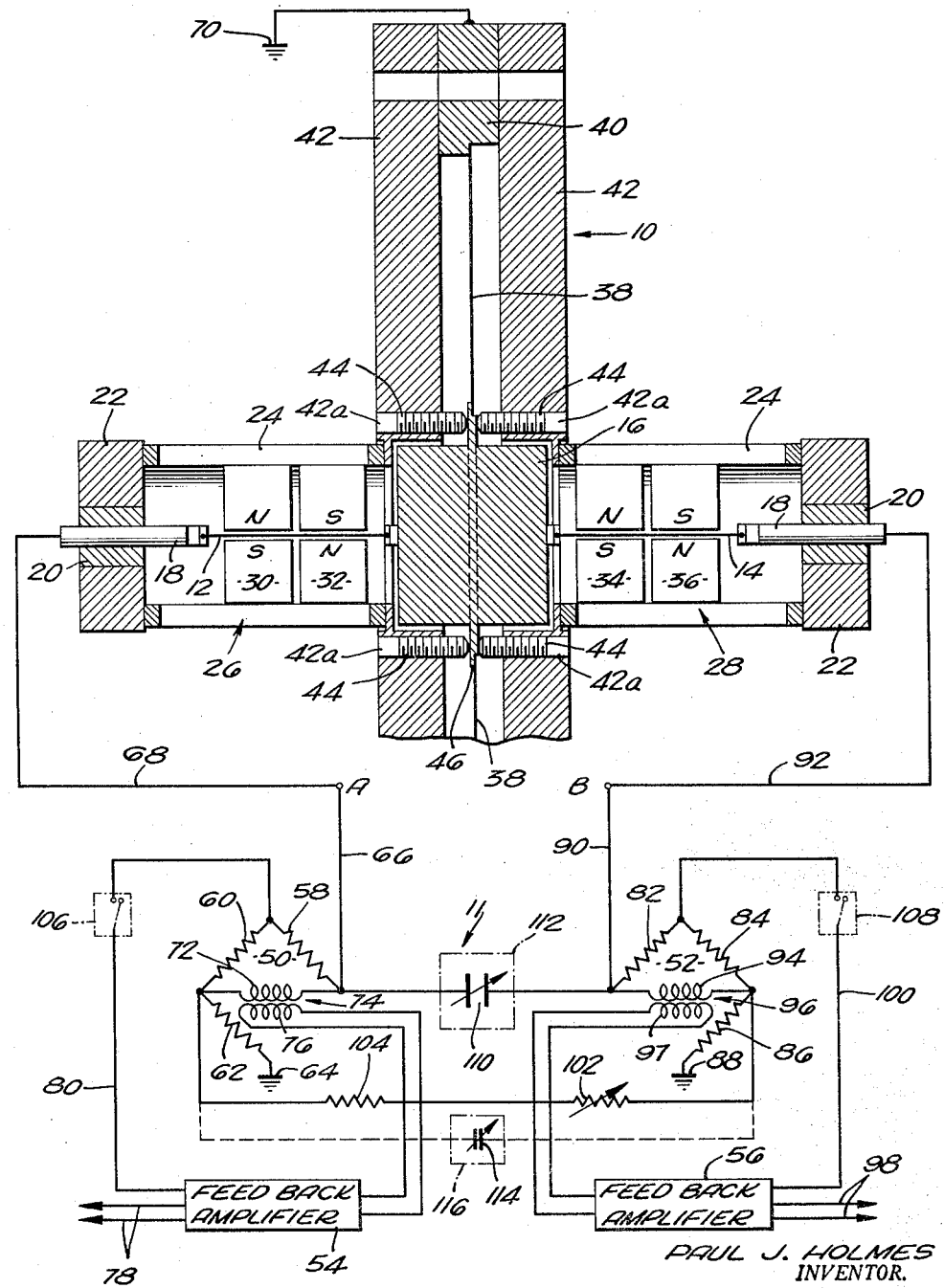
Figure 1 is a diagrammatic view of a transducer system embodying the present invention, the transducer being shown in section.

Referring to Figure 1, it shows a first embodiment of a novel transducer system comprising a mechanical-electrical transducer 10 and electronic means 11 associated therewith. Transducer 10 comprises a pair of electrically conductive vibratory strings 12 and 14 connected to a common condition responsive instrumentality here shown as a seismic mass 16. Each of strings 12 and 14 is connected to a mounting-terminal pin 18 rigidly secured within glass or ceramic hermetic sealing means 20 positioned within and forming a part of an end wall 22 of an enclosure or housing 24. Vibratory strings 12 and 14 are coaxially positioned within housing 24, and, within the scope of this invention, may be electrically conductive strings of any desired cross sectional size or shape, as for instance ribbon-like or polygonal, or they may be constructed of nonconductive material and coated with a good electrical conductor if desired. All of these constructions and configurations of strings 12 and 14 are considered within the scope of the present invention as may be embraced by the language of the appended claims.

Positioned adjacent each of the strings 12 and 14 is magnetic means 26 and 28 respectively for affording magnetic flux flow about and transverse with respect to each of said strings. In the transducer 10 shown in Figure 1, magnetic means 26 comprises a pair of U-shaped permanent magnets 30 and 32 arranged such that the respective magnetic flux flows afforded thereby are substantially coplanar but of opposite direction. In like manner, the magnetic means 28 associated with string 14 comprises a pair of permanent magnets 34 and 36 also arranged with respect to each other such as to afford magnetic flux flow in a given plane but in opposite directions.

Mass 16 is supported in the position shown in Figure 1 by means of a plurality of radially extending support wires 38 which are electrically conductive and which are fastened to a hub-like member 40. Positioned on opposite sides of member 40 and fastened to housing 24 by any desired means are discs 42 provided with a plurality of spaced threaded openings 42a for receiving travel-limiting adjustable stop means or screws 44. As will hereinafter be more readily apparent, screws 44 cooperate with annular shoulder means providing extended portions 46 formed integrally with or secured rigidly to mass 16, the support wires 38 being secured thereto as shown in Figure 1.

The electronic means or circuitry 11 which not only cooperates with transducer 10 but actually electrically includes each of the electrically conductive vibratory strings 12 and 14, comprises a pair of like bridge or resistance networks 50 and 52 and a pair of feedback amplifiers 54 and 56. Bridge network 50 comprises resistors 58, 60 and 62 individually arranged as separate resistance legs of network 50. One end of resistor 62 is grounded as at 64 and, due to lead wire 66 which connects one end of resistor 58 to point A and lead wire 68 which connects said point A to mounting-terminal pin 18 of transducer 10, and also by virtue of grounding of hub-like member 40 as at 70, it is seen that electrically conductive string 12 constitutes the other leg of bridge network 50, said string 12 being connected to ground through seismic mass 16 and the support wires 38. Interconnecting the juncture of lead wire 66 and one end of resistor 58, and the juncture of the ends of resistors 60 and 62 is a primary winding 72 of an output transformer 74 for network 50. Transformer 74 also comprises a secondary winding 76 which is connected to the input side of feedback amplifier 54, the latter having output terminals 78 and a feedback circuit 80 which is connected to the juncture of the ends of resistors 58 and 60 of bridge network 50.

In like manner, bridge network 52 comprises resistors 82, 84 and 86, the latter of which has one end grounded as at 88. Bridge network 52 also includes, as one leg thereof, electrically conductive vibratory string 14 by virtue of conductor 90 which interconnects one end of resistor 82 and point B, conductor 92 which interconnects said point B and the mounting-terminal pin 18 associated with string 14 and the aforementioned ground connection which includes mass 16 and support wires 38. Also in like manner, a primary winding 94 of an output transformer 96 for bridge network 52 is connected between the juncture of resistors 84 and 86, and the juncture of resistor 82 and conductor 90. A secondary winding 97 of transformer 96 is connected to the input side of feedback amplifier 56, the latter of which has output terminals 98 and a feedback circuit 100 which is connected to bridge circuit 52 at the juncture of resistors 82 and 84.

The aforedescribed portion of the transducer system shown in Figure 1 operates to afford an output signal at each of the output terminals 78 and 98 of amplifiers 54 and 56 respectively in accordance with the frequencies of vibration of the respective electrically conductive vibratory strings 12 and 14. That is, the frequency of the output signal realized at the output terminals 78 of amplifier 54 will be the same as the frequency of vibration of string 12 which constitutes a tuned element in the bridge network 50. As will be readily realized by those persons skilled in the art, the frequency of vibration of string 12 will be dependent upon the tension thereof as determined by the position of mass 16 of transducer 10. That is, depending upon the tension of string 12, the latter will vibrate in a plane which is transverse to the magnetic fields afforded by permanent magnets 30 and 32, thereby developing a current flow through string 12 which will have a frequency directly related to the aforementioned vibration frequency thereof. In this manner, a signal will be developed in transformer 74 which will be fed to amplifier 54 such that the output terminals 78 thereof will be provided with an output signal whose frequency is directly related to the frequency of vibration of string 12.

Said string 12 is maintained in vibration at the particular frequency determined by its tension, by virtue of feedback circuit 80 which picks off a portion of the signal amplified by amplifier 54 and feeds it through the entire bridge network 50 thus causing a current flow through string 12 such that the magnetic field afforded thereby coacts with the magnetic fields afforded by permanent magnets 30 and 32 to create a force which maintains the vibrating action of string 12.

As will now be realized, as mass 16 is moved from one position to another as by a change in gravitational force thereon or by change in velocity of transducer 10 as a whole or by change in whatever condition mass 16 is made sensitive to, the tension of string 12 is changed accordingly, wherefore the frequency of vibration thereof and hence the frequency of the output signal at terminals 78 of amplifier 54 is also changed accordingly. Such movement of mass 16 has a like but opposite effect on the tension of vibratory string 14 thereby causing a like but opposite change in the frequency of the signal realized at the output terminals 98 of amplifier 56. As will be realized, this latter effect takes takes place by virtue of the fact that string 14 constitutes a tuned element in bridge network 52 and, due to the vibration of string 14 within the magnetic fields afforded by permanent magnets 34 and 36 and by virtue of the feedback circuit 100 from amplifier 56 to bridge network 52, string 14 is maintained in vibration at a frequency corresponding to its tension and the output of amplifier 56 is provided with a signal the frequency of which is directly related to such tension.

It is contemplated within the scope of this invention that any desired number of magnetic flux affording devices may be associated with each of the vibratory strings depending upon the number of vibrational modes desired. As for example, it is conceivable and contemplated within the teachings of this invention, that rather than having the two magnetic flux affording means 30 and 32 associated with string 12, a single flux affording means or three flux affording means could be employed so that string 12 would vibrate at one or three modes rather than at two as with the construction shown in Figure 1 for illustration of the present invention. All of these variations are considered to be within the scope and spirit of the appended claims whenever the language thereof does not negate such an interpretation.

In view of the foregoing explanation, it is seen that by noting the change in frequency of the output signal of either amplifier 54 and 56, or by noting the change in the frequency difference between such signals, an accurate indication is afforded of the change in position of mass 16 and hence the change in condition to which said mass 16 has responded. However, it will be noted that each of the electrical circuits for the vibratory strings 12 and 14 comprises mass 16, extended portions 46 thereof, support wires 38, hub-like member 40 and appropriate circuit means for grounding the later as at 70. Such common electrical circuitry affords an electrical impedance which is common to both of the vibratory string circuits and hence is common to each of the tuned elements of the bridge networks 50 and 52. Such common electrical impedance has a tendency to cause what is commonly termed electrical coupling whereby electrical signals developed by one string by virtue of its movement within a magnetic field induce a corresponding signal in the other string. As will be realized, such electrical interaction acts in both directions, that is, from string 12 to string 14 and also from string 14 to string 12. This is particularly objectionable since such induced signals or current flows tend to provide a false indication in each of the readout signals at output terminals 78 and 98 of amplifiers 54 and 56 respectively, especially when the vibrational frequencies of strings 12 and 14 are substantially the same. Because of this, the precise correspondence between change in condition acting on mass 16 and change in frequency output of either amplifier 54 and 56 and the precise correspondence between such change in conduition and the change in difference frequency between such amplifier output signals is somewhat disrupted thereby impairing the accuracy and desired precision of the transducer system, particularly when the conditions acting on mass 16 are such as to cause strings 12 and 14 to vibrate at substantially the same frequency.

In order to alleviate this undesirable condition by removing from the outputs of amplifiers 54 and 56 the effects of such electrical coupling, the static sides of the several bridge networks 50 and 52 are interconnected by means of a variable impedance or resistance 102. That is, a circuit comprising variable resistance 102 and a resistor 104, the latter of which is not essential but may be desirable under certain conditions, is connected between the juncture of resistors 60 and 62 of bridge network 50 and the juncture of resistors 84 and 86 of bridge network 52. In order to adjust such variable impedance device so as to completely eliminate the readout effects of the aforementioned electrical coupling, it is necessary to interrupt or disconnect one or the other of the feedback circuits 80 and 100 of amplifiers 54 and 56 respectively. Such disconnection, of course, may be effected in any desired manner as for instance by disconnecting feedback circuit 80 from either the juncture of resistors 58 and 60 of network 50 or the feedback amplifier 54, and, in the alternative, by disconnecting feedback circuit 100 from either the juncture of resistors 82 and 84 of network 52 or from amplifier 56. However, in order to pictorially represent the adaptability of feedback circuits 80 and 100 for interruption or disconnection, I have shown in dash-dash lines a switch within a dash-dot box 106 in feed-back circuit 80 and a like switch and box 108 in feedback circuit 100.

The following, although not necessary to successful practice of this invention, has been found to be a desirable procedure in adjusting variable resistor 102 for compensation of the effects of electrical coupling. Firstly, the condition to which mass 16 of transducer 10 is responsive should be caused to effect vibration of strings 12 and 14 at any widely variant frequencies. This is desirable since the aforedescribed electrical coupling is more easily discernable when the several strings are caused to vibrate at extremely different frequencies.

With this condition existing, it is then necessary to disconnect or interrupt one or the other of the feedback circuits 80 and 100 as above explained. For the sake of example, let feedback circuit 80 remain uninterrupted and let feedback circuit 100 be disconnected so that no feedback current is fed from amplifier 56 to bridge network 52. With this arrangement, wherein the vibratory string 12 is vibrating at its fundamental frequency, whatever electrical coupling exists between strings 12 and 14 will result in the development of an output at the frequency of string 12 from amplifier 56. However, since feedback circuit 100 is not operable, string 14 is not caused to vibrate so that the output from feedback amplifier 56 as realized at output terminals 98 thereof is at the frequency of string 12 and not at the frequency of string 14. Thus, whatever output is derived from amplifier 56 must be the result of electrical coupling. Then, it is merely a matter of adjusting resistor 102 such that minimum output appears across output terminals 98, such adjustment, of course, varying the potential of the static side of bridge network 52 so as to compensate for the potential in the dynamic side of such bridge network due to the aforedescribed electrical coupling effect.

Since the several vibratory strings 12 and 14, the several bridge networks 50 and 52 and all of the various mechanical and electrical components associated therewith are substantially identical and hence are electrically balanced, whatever electrical coupling exists from string 12 to string 14 is substantially identical with the electrical coupling which exists from string 14 to string 12. In view of this, the adjustment of resistor 102 under the conditions aforedescribed, namely, with feedback circuit 100 disconnected, should be sufficient to eliminate the electrical coupling from string 14 to string 12 as would be evidenced by the output of amplifier 54 when feedback circuit 100 is connected or uninterrupted and feedback circuit 80 is disconnected or interrupted. Thus, the aforegoing positioning of adjustable resistor 102 effectively eliminates from the outputs of both amplifiers 54 and 56 any effects whatsoever due to electrical coupling of the vibratory strings as caused by the common electrical impedance aforedescribed.

Another operational difficulty of transducer 10 in providing outputs from amplifiers 54 and 56 which are precise indications of the condition acting on mass 16, is the mechanical coupling between the several vibratory strings 12 and 14 as necessarily results from the fact that said mass 16 cannot be rigidly secured in place but rather must be more or less free-floating or freely suspended. That is, if mass 16 is to be responsive to changes in force or pressure thereon so as to change its position within the transducer 10, it necessarily follows that any vibratory motion of either one of the strings will be transmitted through mass 16 to the other string. It has been discovered that there is approximately 180° phase lag in the movement of mass 16 in response to vibratory movement of one of the strings. Also it has been discovered that such induced movement of mass 16 is transmitted to the other of the several strings with approximately a 90° phase lag between such motion of mass 16 and the resulting motion of said other string when the vibrational frequencies of the several strings are substantially alike. That is, as one of the strings vibrates, such motion tends to cause mass 16 to swivel or pivot back and forth about its mass center, and this movement of mass 16 is, in turn, transmitted to the other string to cause it to vibrate within its magnetic field. The total phase difference between the motion of the inducing string and the motion of the induced string is approximately 90° when the natural frequencies of the two strings are substantially alike; such phase difference being the sum of the 180° phase difference between the inducing string and the mass, the 180° phase change through mass 16 as necessarily results due to the pivotal movement thereof (i.e. one side goes up as other side goes down) and the 90° phase difference between mass 16 and the induced string.

As will be readily apparent to those persons skilled in the art, such mechanical coupling exists in both directions, that is, from string 12 to string 14 and from string 14 to string 12. As will be readily appreciated, such induced movement of the strings within the respective magnetic fields creates a component in the electrical outputs of the amplifiers 54 and 56 which is not the result of the condition acting on mass 16. To this extent, the outputs of amplifiers 54 and 56 do not precisely reflect the condition being sensed and hence it becomes very desirable to eliminate the effects of such mechanical coupling if not to eliminate such mechanical coupling per se.

The aforementioned mechanical coupling is particularly objectionable under those conditions where the several vibratory strings are vibrating at substantially the same frequency, because under these conditions there is a tendency for the induced motions to become synchronized or sympathetic with the fundamental frequency at which both of the strings are vibrating. This, of course, results in mechanical locking of the several strings, and hence a greater change in the condition acting on mass 16 is required to overcome the inertia of such strings to remain in locked condition. As will be readily realized, this too is particularly objectionable in that it further destroys the precision of the transducer in indicating changes in the condition being sensed by mass 16.

In order to alleviate this shortcoming, a variable impedance device, as for instance adjustable capacitor 110 within the dash-dot box 112, is connected in circuit between the dynamic sides, namely between the juncture of resistor 58 and conductor 66 and the juncture of resistor 82 and conductor 90, of the respective bridge networks 50 and 52. The variable capacitor 110 is shown within the dash-dot box 112 since under certain circumstances it may be desirable to employ a different type of variable electrical impedance, as for instance a variable inductor, depending upon the phase relationship between the inducing movement and the induced movement of the several vibratory strings. However, with such relationship being substantially 90°, as above explained, it has been discovered that a variable capacitor is most suitable.

In order to effect the proper adjustment of variable capacitor 110 which, incidentally, is best performed after the above described adjustment of variable resistor 102, it is desirable to position transducer 10 or to control the force acting on mass 16 thereof such as to cause strings 12 and 14 to vibrate at substantially the same frequency since this is the condition wherein the most objectionable mechanical coupling occurs. Also, it is necessary to disconnect one or the other of the feedback circuits 80 and 100 as above described with reference to adjustment of resistor 102. For the sake of example, let feedback circuit 80 remain intact and let feedback circuit 100 be disconnected. Under these conditions whatever vibratory movement string 14 has, which movement necessarily is within the magnetic field afforded by magnets 34 and 36, creates an output across terminals 98 of feedback amplifier 56 as transmitted through transformer 96.

Now, by adjusting variable capacitor 110, a potential of proper magnitude and phase can be applied to the juncture of resistor 82 and conductor 90 so that the potential across the primary winding 94 of transformer 96 is substantially nil. Under these conditions the output across terminals 98 of feedback amplifier 56 is substantially zero as can be readily detected by an instrument for that purpose, and whatever electrical effect is generated by virtue of the mechanical coupling of the several strings is completely cancelled from the output of amplifier 56. If strings 12 and 14, bridge networks 50 and 52 and amplifiers 54 and 56 are balanced so as to provide a substantially symmetrical system, the outputs of both amplifiers 54 and 56 will now be free of any electrical effects resulting from mechanical coupling of the several strings when feedback circuit 100 is reconnected. In this manner, any mechanical coupling of the several strings is completely compensated for in the readout equipment associated with amplifiers 54 and 56 so that the output frequency of either of such amplifiers and the difference frequency between such amplifier outputs will more precisely reflect or indicate the condition acting on mass 16 of transducer 10.

Under certain circumstances, it may be desirable not only to eliminate all electrical effects of mechanical coupling from the outputs of amplifiers 54 and 56, but it may be essential to stop the physical movement of the strings as results from such mechanical coupling. That is, it may be desirable to cancel all of the mechanical forces resulting from such mechanical coupling so that the vibration of the strings is sustained solely by the feedback current flow therethrough and the magnetic field wherein such strings vibrate. In the event this is desirable, it is merely necessary to select the proper adjustable electrical impedance within the dash-dot box 112 such that the interconnection therewith of the dynamic sides of bridge networks 50 and 52 causes a current flow through each of the vibratory strings of such magnitude and phase as to produce a magnetic field about the respective string which coacts with the field wherein such string is vibrating to produce a force thereon of proper magnitude and phase as to completely cancel the force induced thereon by virtue of vibration of the other vibratory string. However, it has been found that by using a variable electrical impedance of such size as to cause the mechanical coupling forces to be cancelled, the electrical potential of the dynamic side of the respective bridge network is increased beyond the potential of the static side thereof. Due to this, it is necessary to alter the potential of the static side of such bridge network so as to compensate for such increased potential on the dynamic side thereof.

In order to accomplish this, it has been found necessary to interconnect the static sides of the bridge networks 50 and 52 by means of an appropriate adjustable impedance device 114, as shown in Figure 1 within a dash-dot box 116. Since the system of Figure 1 shows the use of an adjustable resistor for compensating for electrical coupling as above explained in detail, it is seen that the adjustable impedance device 114 is actually in parallel circuit arrangement with resistors 102 and 104.

Thus, when the feedback circuit 100 is interrupted and adjustable impedance device 110 is adjusted such that vibrating string 14 has no motion whatever as a result of mechanical coupling, it is merely necessary to adjust impedance device 114 such that no output is derived from amplifier 56 across output terminals 98. The lead wires associated with adjustable impedance device 114 are shown in Figure 1 in dash-dash lines since such lead wires and device 114 connected thereto are necessary only when it is desired to interconnect the static sides of bridge networks 50 and 52 such as to prevent any coupling motion of the several strings. Of course, adjustable impedance device 114 has a direct relation to the adjustable impedance device 110 and under certain circumstances may be an adjustable inductor rather than an adjustable capacitor as above explained with reference to the relationship between adjustable impedance device 110 and the mechanical coupling encountered. That is, it is merely necessary that adjustable impedance device 114 afford current flow of proper magnitude and phase between the static sides of bridge networks 50 and 52 to prevent a signal from appearing across the output terminals of the feedback amplifier whose feedback circuit is disconnected.

In this manner, the electrical effect of mechanical coupling is not only prevented from appearing in the output of the amplifiers 54 and 56 when both of the feedback circuits 80 and 100 are operable and strings 12 and 14 are vibrating, but all of the mechanical coupling motion normally appearing in one string as induced therein by the other string is prevented from having any physical effect whatever.

It is realized that the aforedescribed mechanical coupling between the several vibratory strings 12 and 14 can be diminished appreciably, if not eliminated entirely, merely by offsetting the planes of the magnetic fields of the respective strings by 90°. That is, it has been discovered that by rotating permanent magnets 34 and 36 through an angle of 90° from the positions thereof shown in Figure 1 and with respect to permanent magnets 30 and 32, whatever motion might be transmitted from one to another of the several strings will cause movement of the induced string in a direction parallel to the magnetic field wherein such string is vibrating. Thus, such mechanical coupling may not appear as an appreciable electrical output or signal in the electronic amplifier associated with such string, and hence may not be objectionable.

Figure 2:
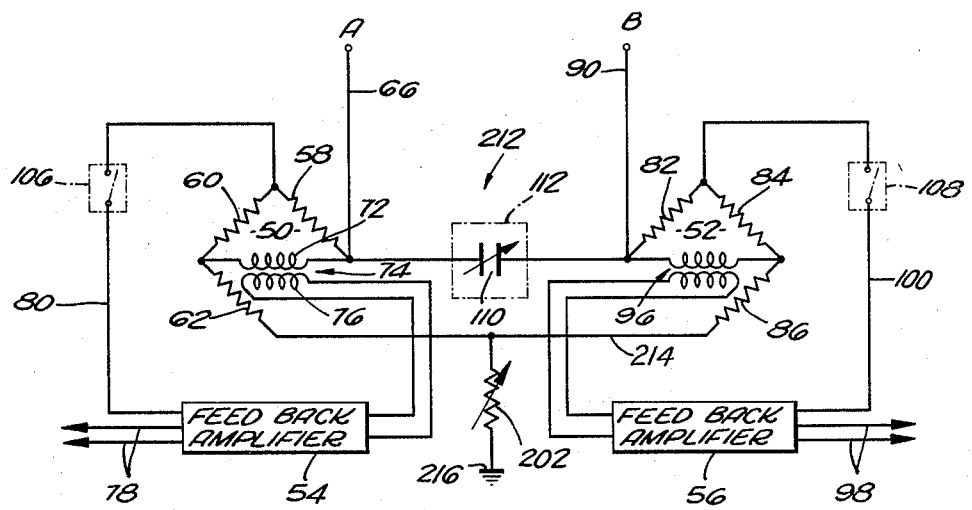
Figure 2 is a diagrammatic view of a second embodiment of the present invention.

Referring to Figure 2, it shows a second embodiment of the electronic means to be associated with the transducer 10 shown in Figure 1. Such electronic means or circuitry 212 of Figure 2 is substantially similar or identical to the electronic circuitry 11 of Figure 1 as indicated by the use of like circuit components which are identified with like reference characters. As will be readily apparent, electronic means 212 is also provided with conductors 66 and 90 which can be connected to conductors 68 and 92 of Figure 1, namely, at point A and B respectively for effecting the proper interconnection between electronic means 212 and transducer 10.

Firstly, the embodiment of Figure 2 differs from the transducer system shown in Figure 1 by virtue of the use of a conductor 214 for interconnecting the ends of resistors 62 and 86 of bridge networks 50 and 52 respectively. Connected between conductor 214 and ground, as at 216, is an adjustable resistor or impedance 202 which functions in the same manner as adjustable resistor 102 of Figure 1, in that it varies the potential of the static sides of the bridge networks 50 and 52 so as to compensate for the above described electrical coupling effects resulting from the common impedance of strings 12 and 14. Of course, the proper adjustment of variable resistor 202 is effected in the same manner as was the proper adjustment of resistor 102 of the embodiment of Figure 1, namely by adjusting resistor 202 so that no output is derived from the amplifier whose feedback circuit is disconnected.

The electrical effects from mechanical coupling of the several vibratory strings can be compensated for in the embodiment of Figure 2 in the same manner as above explained with reference to the embodiment of Figure 1, namely, through proper adjustment of variable impedance device 110.

Figure 3:
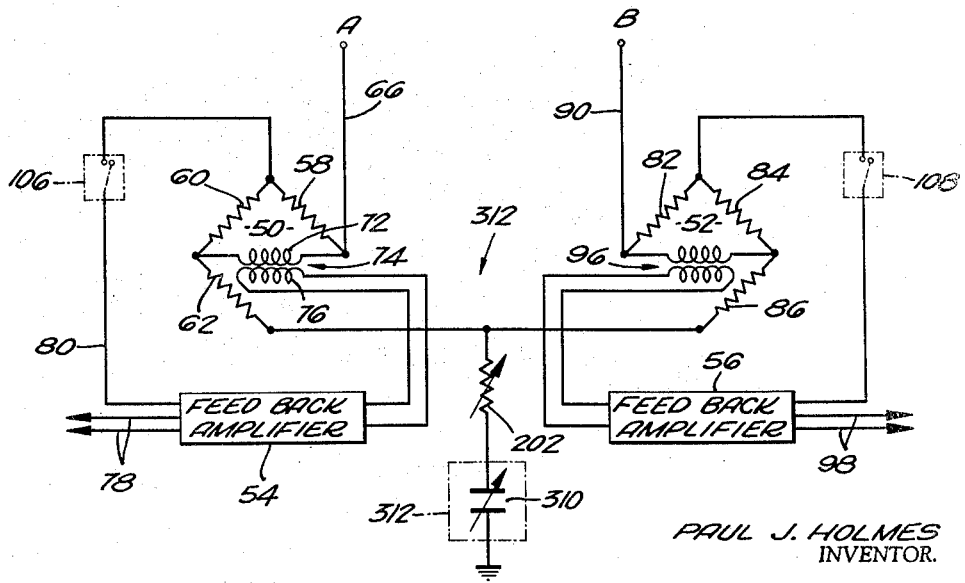
Figure 3 is a diagrammatic view of a third embodiment of the present invention.

Referring to the third embodiment shown in Figure 3, it too is adapted for connection with transducer 10 by means of conductors 66 and 90 which terminate at point A and B respectively. Such third embodiment differs from the embodiment of Figure 2 by removal of adjustable impedance device 110 from its position interconnecting the dynamic sides of bridge networks 50 and 52 and reconnecting the same in series circuit arrangement with the adjustable resistor 202. Such adjustable impedance device is identified in Figure 3 by the numeral 310 and is shown within a dash-dot box 312 to indicate that under certain circumstances, depending upon the phase relationship between the inducing force and the induced force as above explained, it may be desirable, if not necessary, to have the adjustable impedance device comprise an adjustable inductor rather than an adjustable capacitor as shown.

Each of the variable impedance devices 202 and 310 of Figure 3 are adjusted in the same manner as above described with respect to the adjustment of devices 102 and 110 of Figure 1; that is, the adjustable resistor 202 being used to compensate for electrical coupling whereas the adjustable capacitor 310 is employed to compensate for the electrical effects of mechanical coupling.

It will be readily realized by those persons skilled in the art, that suitable means can be provided in each of the embodiments of Figures 2 and 3 for compensating for the increase in output of the bridge networks 50 and 52 caused by effecting sufficient current flow through the several wires so as to completely cancel any movement thereof due to mechanical coupling. Such teachings, of course, are in accordance with the above detailed explanation of the operation and adjustment of the embodiment of Figure 1, with specific reference to the coordination of adjustable impedance devices 110 and 114 shown therein.

It is thus apparent that the present invention provides an improved transducer system for affording an electrical signal or electrical signals having characteristics which vary precisely with variations in a condition being sensed.

Although I have shown and described certain specific embodiments of my invention, I am fully aware that many modifications thereof are possible. My invention, therefore, is not to be restricted except insofar as is necessitated by the prior art and by the spirit and scope of the appended claims.

What I claim is:

1. A transducer system comprising, a mechanical-electrical transducer comprising at least two electrically conductive vibratory strings joined to a common electrically conductive condition responsive means, an oscillatory system for each of said strings comprising a bridge network having a static side of fixed resistance and a dynamic side including the respective string and at least a portion of said electrically conductive condition responsive means, each of said oscillatory systems further including a feedback amplifier connected to the output terminals of the respective bridge network and comprising a feedback circuit to the input terminals thereof, and an electrical impedance device interconnecting the static side output terminals of said bridge networks and being of such size as to control the output of both of said bridge networks to eliminate from the output of said amplifiers the effects of electrical coupling of said strings as caused by the common electrical impedance afforded by said common electrically conductive condition responsive means.

2. A transducer system comprising, a mechanical-electrical transducer comprising at least two electrically conductive vibratory strings joined to a common electrically conductive condition responsive means, an oscillatory system for each of said strings comprising a bridge network having a static side of fixed resistance and a dynamic side including the respective string and at least a portion of said electrically conductive condition responsive means, each of said oscillatory systems further including a feedback amplifier connected to the output terminals of the respective bridge network and comprising a feedback circuit to the input terminals thereof, and an electrical impedance device interconnecting like output terminals of said bridge networks to control the electrical potential thereof to thereby eliminate from the output of said amplifiers the effects of electrical coupling of said strings as caused by the common electrical impedance afforded by said common electrically conductive condition responsive means.

3. A transducer system comprising, a mechanical-electrical transducer comprising at least two electrically conductive strings which individually vibrate in separate magnetic fields at a frequency corresponding to the respective tension of said strings, a common electrically conductive condition responsive mass connected to both of said strings for varying the tensions thereof with variations in a given condition and affording through its supports a common electrical path for said strings, an oscillatory system for each of said strings comprising a bridge network having a static side of fixed resistance and a dynamic side including the respective string and at least a portion of both said mass and its supports, each of said oscillatory systems further including a feedback amplifier connected to the output terminals of the respective bridge network and comprising a feedback circuit to the input terminals thereof, and means interconnecting like terminals of said bridge networks to control the electrical potential thereof to eliminate from the output of said amplifiers the effects of electrical coupling of said strings as caused by the common electrical impedance afforded by said condition responsive mass and its supports, wherefore changes in the outputs of said amplifiers are more accurate indications of a change in said given condition.

4. A transducer system comprising, a mechanical-electrical transducer comprising at least two electrically conductive vibratory strings joined to a common electrically conductive condition responsive means, an oscillatory system for each of said strings comprising a bridge network having a static side of fixed resistance and a dynamic side including the respective string and at least a portion of said electrically conductive condition responsive means, each of said oscillatory systems further including a feedback amplifier connected to the output terminals of the respective bridge network and comprising a feedback circuit to the input terminals thereof, electrical conductor means interconnecting predetermined like points on the static side of said bridge networks, and an electrical impedance device interconnecting said conductor means and a point of ground potential, said impedance device being of such size as to control the output of said bridge networks to eliminate from the output of said amplifiers the effects of electrical coupling of said strings as caused by the common electrical impedance afforded by said common electrically conductive condition responsive means.

5. A transducer system comprising, a mechanical-electrical transducer comprising at least two electrically conductive prestressed vibratory strings interconnected through a common movable condition responsive mass for varying the tension of said strings, an oscillatory system for each of said strings comprising a bridge network having a static side of fixed resistance and a dynamic side including the respective string, each of said oscillatory systems further including a feedback amplifier connected to the output terminals of the respective bridge network and comprising a feedback circuit to the input terminals thereof, and electrical impedance means interconnecting the dynamic side output terminals of said networks to control the output of both of said networks to eliminate from the output of said amplifiers the effects of mechanical coupling of said strings by virtue of the common movable mass.

6. A transducer system comprising, a mechanical-electrical transducer comprising at least two electrically conductive prestressed vibratory strings interconnected through a common movable condition responsive mass for varying the tension of said strings, an oscillatory system for each of said strings comprising a bridge network having a static side of fixed resistance and a dynamic side including the respective string, each of said oscillatory systems further including a feedback amplifier connected to the output terminals of the respective bridge network and comprising a feedback circuit to the input terminals thereof and means including an electrical capacitor interconnecting predetermined like points of said bridge networks to control both the magnitude and phase of the electrical potential of said predetermined points so as to completely eliminate from the output of said amplifiers as determined by the respective resistance networks the effects of mechanical coupling of said strings as caused by said common movable mass.

7. A transducer system comprising, a mechanical-electrical transducer comprising at least two electrically conducitve prestressed strings which vibrate in a magnetic field and which are interconnected through a common movable condition responsive mass for varying the tension and hence the frequency of vibration of said strings, an oscillatory system for each of said strings comprising a bridge network having a static side of fixed resistance and a dynamic side including the respective string, each of said oscillatory systems further including a feedback amplifier connected to the output terminals of the respective bridge network and comprising a feedback circuit to the input terminals thereof, and an electrical impedance device interconnecting the dynamic side output terminals of said bridge networks to provide current flow through said strings of such magnitude and phase as to create a magnetic field thereabout which combines with the respective magnetic field wherein the respective string vibrates to create a force of such magnitude and phase as to balance the force transmitted thereto by virtue of mechanical coupling of said strings through said movable mass, whereby each of said strings is caused to be unaffected by movement of the other of said strings so that the outputs of said amplifiers more accurately indicate the condition acting on said common condition responsive mass.

8. A transducer system comprising, a mechanical-electrical transducer comprising at least two electrically conductive prestressed vibratory strings interconnected through a common electrically conductive movable condition responsive mass for varying the tension of said strings, an oscillatory system for each of said strings comprising a bridge network having a static side of fixed resistance and a dynamic side including the respective string and at least a portion of said condition responsive mass, each of said oscillatory systems further including a feedback amplifier connected to the output terminals of the respective bridge network, and comprising a feedback circuit to the input terminals thereof, means including a first electrical impedance associated with the static side output terminals of said bridge networks to eliminate from the outputs of said amplifiers any effects of electrical coupling as caused by the common electrical impedance of said condition responsive mass, and means including a second electrical impedance associated with the dynamic side output terminals of said bridge networks to eliminate from the output of said amplifiers the effects of mechanical coupling of said strings through said common movable mass.

9. A transducer system comprising, a mechanical-electrical transducer comprising at least two electrically conductive prestressed vibratory strings interconnected through a common electrically conductive movable condition responsive mass for varying the tension of said strings, an oscillatory system for each of said strings comprising a bridge network having a static side of fixed resistance and a dynamic side including the respective string and at least a portion of said condition responsive mass, each of said oscillatory systems further including a feedback amplifier connected to the output terminals of the respective bridge network and comprising a feedback circuit to the input terminals thereof, means including an electrical resistor associated with the static side output terminals of said bridge networks and being of such size as to control the potential of the static side output terminals of said networks to eliminate from the outputs of said amplifiers any effects of electrical coupling as caused by the common electrical impedance of said condition responsive mass, and means including an adjustable capacitor associated with the dynamic side output terminals of said bridge networks and being of such size as to control the potential and phase of the dynamic side output terminals of said networks to eliminate from the output of said amplifiers the effects of mechanical coupling of said strings through said common movable mass.

References Cited in the file of this patent
UNITED STATES PATENTS 2,725,492  Allan _____ Nov. 29, 1955

FOREIGN PATENTS 789,611  Great Britain _____ Jan. 22, 1958